United States Patent [19]

Gotanda

[11] Patent Number: 4,974,624

[45] Date of Patent: Dec. 4, 1990

[54] GAS SHUT-OFF DEVICE

[76] Inventor: Motohiro Gotanda, 1802-10, Nakabiyo, Abiko-shi, Chiba-ken, Japan

[21] Appl. No.: 493,580

[22] Filed: Mar. 14, 1990

[51] Int. Cl.⁵ .................... F16K 17/36; F16K 31/08
[52] U.S. Cl. ................................ 137/78.4; 137/629; 251/65
[58] Field of Search ............... 137/78.4, 78.5, 462, 137/629; 251/65, 129.11

[56] References Cited

U.S. PATENT DOCUMENTS

| | | | |
|---|---|---|---|
| 2,297,797 | 10/1942 | Oetiker | 137/629 |
| 2,589,188 | 3/1952 | DeCraene et al. | 251/65 |
| 2,729,221 | 1/1956 | Gorham et al. | 137/78.4 X |
| 3,134,404 | 5/1964 | Ziccardi | 251/65 X |
| 3,355,140 | 11/1967 | Andersen | 251/65 X |
| 3,783,887 | 1/1974 | Shoji | 251/65 X |
| 4,491,142 | 1/1985 | Shimizu | 251/65 X |

*Primary Examiner*—Stephen M. Hepperle
*Attorney, Agent, or Firm*—Jordan and Hamburg

[57] ABSTRACT

A gas shut-off device comprising a housing having a gas inflow hole and a gas outflow hole, the housing including therein a first shut-off valve with permanent magnets for closing and opening the gas flow passage, a partition having an opening formed therein for allowing gas to flow little by little from the inflow side into the outflow side, a second shut-off valve with permanent magnets for shutting off the flow of gas through the opening in the partition; and a solenoid having a rotary element being rotatable in forward and reverse directions according to a signal from a gas detector and a signal from a reset service respectively, the rotary element having a first permanent magnet to attract or repel the permanent magnet of the first shut-off valve at each stop position of the rotary element and a second permanent magnet to attract or repel the permanent magnet of the second shut-off valve at each stop position of the rotary element.

5 Claims, 3 Drawing Sheets

GAS SHUT-OFF DEVICE

BACKGROUND OF THE INVENTION

The present invention relates to a gas shut-off device which can be reset by a simple operation.

Recently, each gas meter is usually provided with a gas detector which in combination with a leak detector and/or a seismosensor actuates a gas shut-off device to interrupt the flow of gas. Consequently, when any gas shut-off device once automatically operated to cut off the gas flow in the event of leak or earthquake, it is necessary to reset by hand the gas shut-off device at a place where it is mounted.

However, since the traditional gas shut-off devices mentioned above require manual resetting on site because homemakers and the aged are weak in dealing with it, there may be the problem that in the event of a leak the resetting can be done only by persons from the gas company.

SUMMARY OF THE INVENTION

It is an object of the present invention to provide a gas shut-off device which can be reset by remote control by simply pushing a button provided in side a house.

It is another object of the present invention to provide a gas shut-off device which is capable of completely interrupting the flow of gas in side an inflow passage with no leakage into the outflow side, thereby completely interrupting the flow of the gas in side an inflow passage with no leakage into the outflow side, thereby completely eliminating the occurrence of an explosion from a gas leak and which has a gas inflow hole and a gas outflow hole in its housing which includes a first shut-off valve with permanent magnets for closing and opening the gas flow passage, a partition having an opening formed therein for allowing gas to flow little by little from the inflow side to the outflow side, a second shut-off valve with permanent magnets for shutting off the flow of gas, through the opening in the partition, and a solenoid provided with a rotary element to be rotated in forward and reverse directions according to a signal from a gas detector and a signal from a reset device, said rotary element having a first permanent magnet to attract or repel the permanent magnet of the first shut-off valve at each stop position of the rotary element, and a second permanent magnet to attract or repel the permanent magnet of the second shut-off valve.

It is a further object of the invention to provide a gas shut-off device which, even if it is difficult to open a first shut-off valve due to a difference in pressure of the gas in front of and behind the first shut-off valve, is able to completely and reliably reset the first shut-off valve by actuating a second shut-off valve to open a partition opening to reduce the differential gas pressure.

It is another object of the invention to provide a gas shut-off device which, even if a reset device is operated while a gas detector is still in a working state, i.e. a leak has not been eliminated, it can automatically be operated again by a signal from the gas detector, thus minimizing the danger from gas leaking due to the malfunctioning of the reset device.

It is further object of the invention to provide a gas shut-off device wherein a reset device can be easily operated by only pushing a button which can be placed at any desired position in room so as to reset the gas shut-off device by remote control.

The above-mentioned features and other advantages of the present invention will be apparent from the following detailed description which goes with the accompanying drawings.

DESCRIPTION OF THE PREFERRED EMBODIMENTS

Figure 1A:
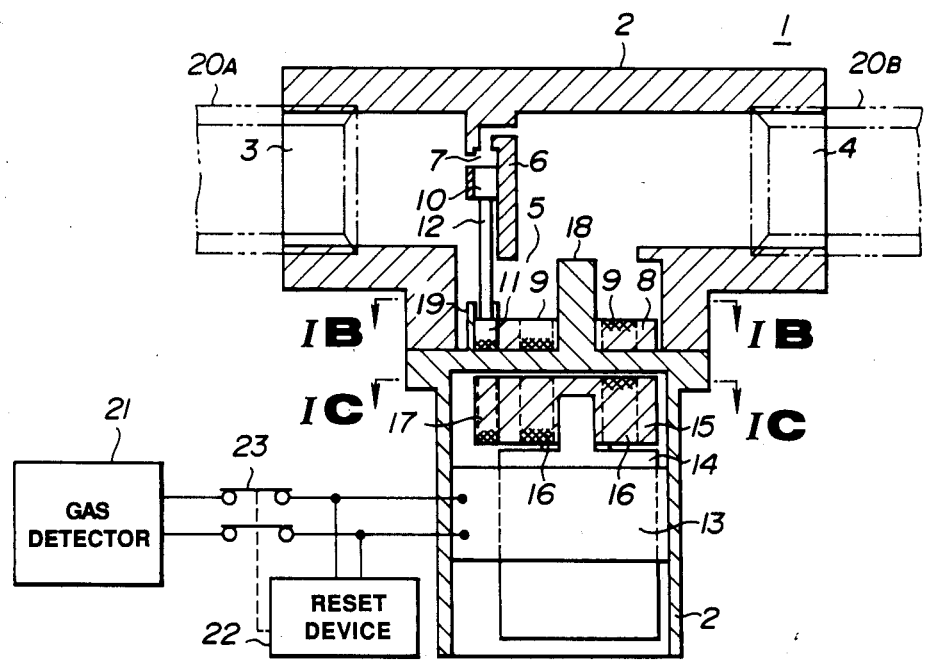
FIG. 1A is a sectional side view showing an embodiment of a gas shut-off device according to the present invention.
Figure 1B:
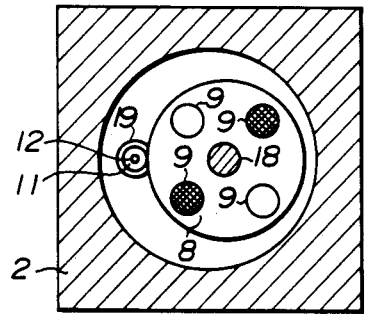
FIG. 1B is a sectional view along line 1B—1B of FIG. 1A.
Figure 1C:
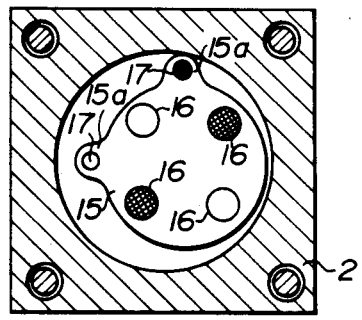
FIG. 1C is a sectional view along, line 1C—1C of FIG. 1A.

FIG. 1A–1C show an embodiment of the present invention. FIG. 1A is a sectional side view, FIG. 1B is a sectional view along line B—B of FIG. 1A and FIG. 1C is a sectional view along line 1C—1C of FIG. 1A. In these drawings, numeral 1 designates the complete device for shutting off according to the present invention. A housing 2 for the gas shutting off device 1 has a gas inlet 3, a gas outlet 4, a gas passage 5 and a partition 6 with an opening 7 formed therein and includes a first shut-off valve 8 for interrupting the flow of gas in the passage 5. Said first shut-off valve is provided with permanent magnets 9 equally spaced as for example at 90° C. from each other on the circumference of the valve, while alternating their polarities each in turn. In FIGS. 1A to 1C, the north pole of the permanent magnets are indicated by a mesh-like pattern. In the housing, there are also a second shut-off valve 10 for interrupting the flow of gas through the opening 7, a permanent magnet 11 for driving the second shut-off valve 10, a rod 12 for connecting the second shut-off valve with the permanent magnet 11, a solenoid 13 being rotatable and alternating its rotation at direction as for example at 90°. C. intervals, a rotor 14 of the solenoid 13, and a rotary element 15, directly connected with the rotor 14. First permanent magnets 16 are mounted on the rotary element 15 in such a way that they are opposed with unlike polarities to the permanent magnets 9 on the first shut-off valve so as to be attracted to each other.

Second permanent magnets 17 are mounted on each protrusion of the rotary element 15 in such a way that they are located 90° C. apart around the rotary element 15 and are opposed to the permanent magnet 11 of the second shut-off valve 10, one having a like polarity to repel the permanent magnet 11 and the other having an unlike polarity to attract the magnet 11. 19 is a guide 19 for the permanent magnet of the second shut-off valve 10, 20A and 20B are pipings connected to the gas inlet 3 and the gas outlet 4 respectively, and 21 is a gas detector connected to the solenoid 13 to be driven into action by gas detection signal. 22 is a reset device for resetting the solenoid 13, which is operated by pushing a button (not shown) to supply the solenoid 13 with current that is opposite in polarity to the current for exiting the solenoid. A relay 23 is provided to cut off the electric circuit of the gas detector 21 when the reset device 22 is operateing.

The operation is as follows:

In normal conditions the gas shut-off device 1 is not actuated, keeping the first shut-off valve 8, the second shut-off valve 10 and the rotary element in the state shown in FIGS. 1A and 1C. Namely, since the permanent magnets 9 of the first shut-off valve 8 are moved down, under the effect of the attracting force of the first permanent magnet 16 of the rotary element 15, the gas-flow passage 5 is opened to allow the normal passage of gas therethrough. In this case, the second shut-off valve 10 is also lowered by the effect of the attracting force of the permanent magnet 17 of the rotary element 15 and thereby an opening 7 is mode to allow a small amount of gas therthrough.

Figure 2A:
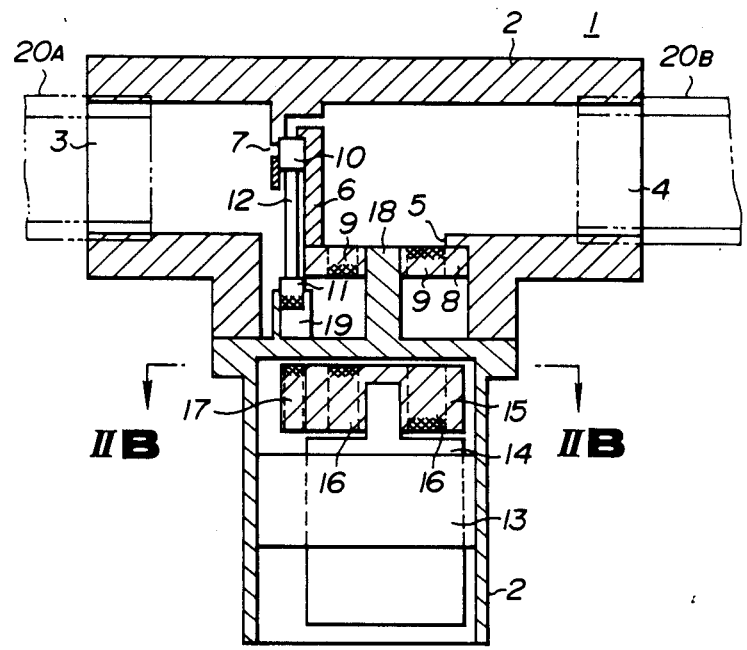
FIGS. 2A, 2B, 3A and 3B are views for explaining the operations of the gas shut-off device according to the present invention.
Figure 2B:
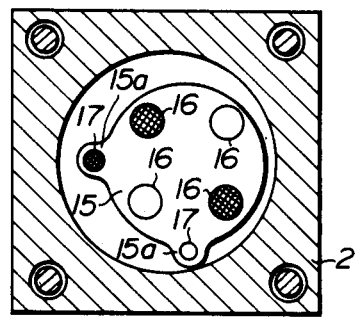

In the event of gas leakage, the gas detector 21 operates to produce an output signal by which current is supplied to the solenoid 13 and its rotor 14 rotates counter-clockwise by 90° C. and at the same time the rotary element 15 rotates to the position shown in FIG. 2B.

Accordingly, the first permanent magnet 16 of the rotary element 15 and the permanent magnet 9 of the first shut-off valve 8 are opposed to each other with like magnetic poles to produce a repeling force threat, and thereby the first shut-off valve 8 moves upward to close the gas passage 5 as shown in FIG. 2A. Since the permanent magnet 11 of the second shut-off valve 10 and the second permanent magnet 17 of the rotary element 15 are opposed to each other with like magnetic poles and thereby repel each other, the second shut-off valve 10 is raised to close the opening 7. Consequently, the gas in the inlet side 3 of the housing 2 is completely sealed off with no gas leakage into the outlet side 4. At this time, since the gas pressure at the inlet side 3 increases and the gas pressure at the outlet side 4 decreases, both the first shut-off valve 8 and the second shut-off valve 10 are attracted toward the low pressure side to keep the passage 5 and the opening 7 respectively in a tightly closed state as shown in FIG. 2A.

Figure 3A:
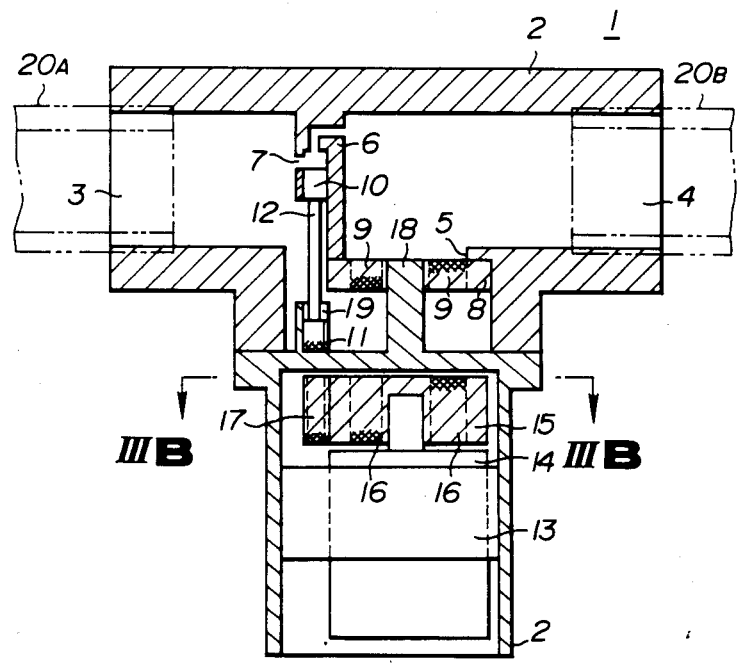
Figure 3B:
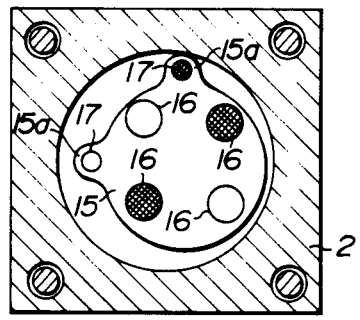

After the leakage has been eliminated, the gas shut-off device 1 shall be released by putting the reset device 22 into operation. In this case, the reset device is activated 23 to turn off gas the detector 21 and then to supply a current with a reverse polarity to the solenoid 13 which in turn rotates the rotor 14 clockwise by 90° C. and thereby places the rotary element 15 in the position shown in FIG. 1C as shown in FIG. 3B. In this case, the permanent magnet 9 of the first shut-off valve 8 and first permanent magnet 16 of the rotary element 15 are opposed to each other with unlike polarities and the former is attracted downwards by the latter but the first shut-off valve 8 is kept from being lowered because the differential pressure produced between the high pressure side and the low pressure side of the first shut-off valve 8 is larger than the attracting force of the permanent magnets 11 and 16. On the other hand, the permanent magnet 11 of the second shut-off valve 10 is attracted by the permanent magnet 17 of the rotary element 15 and in this case it is lowered to create the opening 7 as shown in FIG. 3A since the second shut-off valve 10 is small in size and the attracting force between the permanent magnets 11 and 17 exceeds the difference in pressure acting on the second shut-off valve 10.

Consequently, gas flows from the inlet side 3 into the outlet side 4 through the opening 7 to reduce the difference in pressure at the inlet 3 and the outlet 4, thereby the first shut-off valve 8 is lowered and the gas shut-off device returns its normal position as shown in FIG. 1A.

It is also possible to provide a gas shut-off device 1 with seismosensor not shown) that is parallel with the gas detector 21 so as to operate the device in the same way as mentioned above if an earthquake should occur.

As is apparent from the foregoing description, according to the present invention, it is possible to provide a gas shut-off device which has a gas inlet-hole and a gas outlet-hole in its housing which includes a first shut-off valve with permanent magnets for closing and opening the gas flow passage, a partition having an opening formed therein for allowing gas to flow little by little from the inflow side into the outflow side, a second shut-off valve with permanent magnets for shutting off the flow of gas through the opening in the partition, and which is provided with a solenoid with a rotary element to be rotated in normal and reverse directions according to a signal from a gas detector and a signal from a reset device, said rotary element having a first permanent magnet to attract or repel the permanent magnet of the first shut-off valve when the rotary element rotates, and a second permanent magnet to attract or repel the permanent magnet of the second shut-off valve, and which is capable of completely interrupting the flow of gas at the inflow side of the housing with no leakage into the outflow side and thereby completely eliminating the possibility of the occurrence of an explosion caused by a gas leak. ( . . . an explosion paused by a gas leak).

Furthermore, even if it is difficult to open the first shut-off valve due to a big difference between the pressure of the inlet and outlet, the gas shut-off device is able to completely and reliably reset the first shut-off valve by actuation a second shut-off valve to open a partition opening to reduce the differential gas pressure. If the reset device is operated while the gas detector is still in an operating state, i.e. a leak has not been eliminated, the gas shut-off device can operate automatically because of signal from the gas detector, thus minimizing a possible leak due to the malfunctioning of the reset device. The reset device can be easily and remotely controlled by only pushing button placed at any desired indoor position thereby eliminating the necessity of resetting the gas shut-off device outdoors and also of protecting said device from being operated by an unknown person.

What is claimed is:

1. A gas shut-off device comprising: a housing with a gas inflow hole and a gas outflow hole, said housing including therein a first shut-off valve with permanent magnets for closing and opening the gas flow passage, a partition having an opening formed therein for allowing gas to flow little by little from the inflow side into the outflow side, a second shut-off valve with permanent magnets for shutting off the flow of gas through the opening in the partition; a solenoid having a rotary element to be rotated in forward and reverse directions according to a signal from a gas detector and a signal from a reset device respectively, said rotary element having a first permanent magnet to attract or repel the permanent magnet of the first shut-off valve at each stop position of the rotary element and a second permanent magnet to attract or repel the permanent magnet of the second shut-off valve at each stop position of the rotary element.

2. A gas shut-off device according to claim 1, characterized in that a rotor being driven by the solenoid is provided and directly connected with the rotary element.

3. A gas shut-off device according to claims 1 or 2, characterized in that a rod is provided for connecting the second shut-off valve with the permanent magnet for actuating said second shut-off valve.

4. A gas shut-off device according to claimss 1 or 2 characterized in that a guide for moving up and down the first shut-off valve and a guide for moving up and down the second shut-off valve are provided.

5. A gas shut-off device according to claims 1 or 2 characterized in that a relay is provided for shutting off the circuit of the gas detector at the time of the actuation of the reset device.

* * * * *